US 11,176,104 B2

(12) United States Patent
Chauhan et al.

(10) Patent No.: US 11,176,104 B2
(45) Date of Patent: Nov. 16, 2021

(54) PLATFORM-INDEPENDENT INTELLIGENT DATA TRANSFORMER

(71) Applicant: BANK OF AMERICA CORPORATION, Charlotte, NC (US)

(72) Inventors: Sandeep Kumar Chauhan, Hyderabad (IN); Srinivas Tatikonda, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 150 days.

(21) Appl. No.: 15/954,272

(22) Filed: Apr. 16, 2018

(65) Prior Publication Data
US 2019/0318020 A1    Oct. 17, 2019

(51) Int. Cl.
*G06F 11/00*  (2006.01)
*G06F 16/21*  (2019.01)
*G06F 11/07*  (2006.01)
*G06F 16/23*  (2019.01)

(52) U.S. Cl.
CPC ........ *G06F 16/211* (2019.01); *G06F 11/0709* (2013.01); *G06F 11/0727* (2013.01); *G06F 11/0751* (2013.01); *G06F 11/0769* (2013.01); *G06F 16/2379* (2019.01)

(58) Field of Classification Search
CPC ...... G06F 16/258; G06F 16/88; G06F 40/151; G06F 40/154; G06F 11/0709; G06F 11/0727; G06F 11/0751; G06F 11/0769
See application file for complete search history.

(56) References Cited

U.S. PATENT DOCUMENTS

| 5,420,979 | A | 5/1995 | Madden et al. |
| 5,576,757 | A | 11/1996 | Roberts et al. |
| 6,208,345 | B1 | 3/2001 | Sheard et al. |
| 6,310,647 | B1 | 10/2001 | Parulski et al. |
| 6,397,191 | B1* | 5/2002 | Notani ............... G06F 9/46 705/7.26 |
| 6,453,356 | B1 | 9/2002 | Sheard et al. |
| 6,795,868 | B1* | 9/2004 | Dingman ............ G06F 16/258 709/246 |
| 6,820,135 | B1* | 11/2004 | Dingman ............ G06F 16/258 709/246 |
| 6,901,403 | B1 | 5/2005 | Bata et al. |
| 7,111,076 | B2 | 9/2006 | Abjanic et al. |

(Continued)

*Primary Examiner* — Loan L. T. Truong
(74) *Attorney, Agent, or Firm* — Michael A. Springs; Moore & Van Allen PLLC; R. W. McCord Rayburn

(57) ABSTRACT

A system, computer program product, and computer-implemented method are provided for platform-independent data transformation. A data transformation module is provided, the data transformation module being configured to receive input data from a source application having a first data format, the input data to be transferred to a target application having a second data format, wherein the first data format and the second data format are different data formats; generate a matrix graph, using the data transformation module, to map one or more source fields from the source application to one or more target fields from the target application; based on the matrix graph, transform the input data from the first data format to generate output data in a second data format, wherein the output data is compatible with the target application; and transfer the output data to the target application.

20 Claims, 8 Drawing Sheets

(56) References Cited

U.S. PATENT DOCUMENTS

| | | |
|---|---|---|
| 7,590,644 B2 | 9/2009 | Matsakis et al. |
| 7,814,142 B2 | 10/2010 | Mamou et al. |
| 7,814,470 B2 | 10/2010 | Mamou et al. |
| 8,060,553 B2* | 11/2011 | Mamou ............... G06F 16/254 709/203 |
| 8,112,738 B2 | 2/2012 | Pohl et al. |
| 8,413,109 B2 | 4/2013 | Pfeifer et al. |
| 8,732,655 B2 | 5/2014 | Pfeifer |
| 8,788,931 B1 | 7/2014 | Chen et al. |
| 8,825,695 B2 | 9/2014 | Studer et al. |
| 8,930,337 B2 | 1/2015 | Studer et al. |
| 9,087,088 B1* | 7/2015 | Bose ...................... G06F 16/22 |
| 9,465,590 B2 | 10/2016 | Ivanov et al. |
| 10,706,066 B2* | 7/2020 | Ganjam ............... G06F 21/604 |
| 10,783,183 B2* | 9/2020 | Wechsler ............ G06F 16/212 |
| 2003/0041095 A1* | 2/2003 | Konda ................. G06F 16/258 709/201 |
| 2005/0262189 A1* | 11/2005 | Mamou ............... G06F 16/254 709/203 |
| 2007/0185953 A1* | 8/2007 | Prokopenko ........... G06F 7/483 708/523 |
| 2009/0132901 A1* | 5/2009 | Zhu ...................... G06F 16/951 715/206 |
| 2009/0303239 A1* | 12/2009 | Ang ..................... G06F 16/248 345/440 |
| 2011/0032328 A1 | 2/2011 | Raveendran et al. |
| 2011/0032329 A1 | 2/2011 | Bauza et al. |
| 2011/0113095 A1* | 5/2011 | Hatami-Hanza ...... H04L 69/329 709/204 |
| 2012/0209886 A1* | 8/2012 | Henderson ........... G06F 16/211 707/798 |
| 2013/0086124 A1* | 4/2013 | Bahl .................... G06F 16/258 707/802 |
| 2013/0173751 A1* | 7/2013 | Zachos ................. H04L 69/08 709/219 |
| 2013/0174116 A1* | 7/2013 | Pfeifer .................... G06F 8/10 717/104 |
| 2013/0179772 A1* | 7/2013 | Nakamura ........... G06F 40/143 715/234 |
| 2013/0204756 A1* | 8/2013 | Orttung ................. G06Q 40/02 705/30 |
| 2013/0226944 A1* | 8/2013 | Baid ..................... G06F 16/88 707/756 |
| 2013/0246376 A1* | 9/2013 | Padmanabhan ....... G06F 16/254 707/694 |
| 2013/0325627 A1* | 12/2013 | Kimmerling ...... G06Q 30/0631 705/14.66 |
| 2014/0244657 A1* | 8/2014 | Mizell ................. G06F 11/206 707/743 |
| 2016/0188305 A1* | 6/2016 | Rong ...................... G06F 8/31 717/154 |
| 2016/0224637 A1* | 8/2016 | Sukumar ............ G06F 16/2465 |
| 2017/0221240 A1* | 8/2017 | Stetson ................ G06F 16/904 |
| 2017/0279687 A1* | 9/2017 | Muntes-Mulero .... H04L 41/065 |
| 2018/0095632 A1* | 4/2018 | Leeman-Munk ........ G06N 3/04 |
| 2018/0121601 A1* | 5/2018 | Hahm .................... G16B 50/00 |
| 2018/0150528 A1* | 5/2018 | Shah .................... G06F 16/282 |
| 2018/0189675 A1* | 7/2018 | Nurvitadhi ............. G06F 17/16 |
| 2018/0191503 A1* | 7/2018 | Alwar ................. G06Q 20/065 |
| 2019/0355152 A1* | 11/2019 | Li ........................ G06T 3/4084 |

* cited by examiner $$\{/t_1/t_2/t_3/t_4\}$$

| | | | | |
|---|---|---|---|---|
| $t_1$ | null | null | null | null |
| null | $t_2$ | null | null | null |
| null | null | $t_3$ | null | null |
| null | null | null | $t_4$ | null |
| null | $t_5$ | null | null | null |
| null | null | $t_6$ | null | null |
| null | null | null | $t_7$ | null |
| null | null | null | null | $t_8$ |
| null | $t_9$ | null | null | null |
| null | null | $t_{10}$ | null | null |
| null | null | null | $t_{11}$ | null |

*FIG. 6*

PLATFORM-INDEPENDENT INTELLIGENT DATA TRANSFORMER

BACKGROUND

Data interchange occurs widely across organizations on a daily basis. Furthermore, applications within the organizations may have different data and/or data formats which require transformation of the data in order to be made compatible with one another. As a result, there exists a need for an optimized data transformation system.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for platform-independent data transformation. The invention may be exampled by a system which defines a specific embodiment of the invention. The system typically comprises: a data transformation module; a memory device with computer-readable program code stored thereon, the memory device comprising a plurality of applications; a communication device in communication with a network; and a processing device operatively coupled to the memory device and the communication device, wherein the processing device is configured to execute the computer-readable program code to: receive input data from a source application having a first data format, the input data to be transferred to a target application having a second data format, wherein the first data format and the second data format are different data formats; generate a matrix graph, using the data transformation module, to map one or more source fields from the source application to one or more target fields from the target application; based on the matrix graph, transform the input data from the first data format to generate output data in a second data format, wherein the output data is compatible with the target application; and transfer the output data to the target application.

In one embodiments, generating the matrix graph further comprises mapping a plurality of source fields in the first data format to a plurality of corresponding target fields of the second format.

In one embodiments, transforming the input data further comprises transferring elements of the input from the source fields to the corresponding target fields of the matrix graph to generate the output data.

In one embodiments, the matrix graph is generated dynamically in real-time at initialization of a transformation operation. In another embodiment, the matrix graph is deleted after the transformation operation is completed.

In one embodiments, the data transformation module further comprises a mapping compiler module configured for: retrieving and verifying mapping schema, rules, and semantics; and generating a mapping configuration outlining a transformation operation of the input data. In one embodiment, the data transformation module generates the mapping configuration based on a past transformation operation.

In one embodiment, the data transformation module further comprises a parser module configured for: reading the mapping configuration; identifying the source application and the target application; parsing the input data from the source application; and retrieving the one or more source fields, the one or more target fields, and the input data as defined by the mapping configuration.

In one embodiment, the data transformation module further comprises a validator module configured for validating the one or more source fields, the one or more target fields, and the input data as defined by the mapping configuration. In another embodiment, the processing device is further configured to: generate an exception path in response to identifying an error; and reconfigure the configuration map. In yet another embodiment, the processing device is further configured to advance the error to a support representative.

In one embodiment, the data transformation module further comprises an enricher module configured for at least one of converting, updating, appending, or modifying the one or more source fields and the input data.

In one embodiment, the data transformation module further comprises a target builder module configured for: generating the matrix graph based on the mapping configuration; and based on the matrix graph, generating the output data in the second data format for the target application. In one embodiment, the target builder module generates the output data in the second format without generating additional code.

In one embodiment, the data transformation module further comprises a data store comprising mapping schema, rules, and semantics for transforming the input data in the first data format to the output data in the second data format.

In one embodiment, the processing device is further configured to execute the computer-readable program code to transmit a status update for each stage of a transformation operation to a logger.

In one embodiment, the data transformation module interfaces across heterogeneous applications.

A computer program product for platform-independent data transformation is also provided. The computer program product comprises at least one non-transitory computer readable medium comprising computer readable instructions, the computer readable instructions, when executed by a computer processor, cause the computer processor to: receive input data from a source application having a first data format, the input data to be transferred to a target application having a second data format, wherein the first data format and the second data format are different data formats; generate a matrix graph, using a data transformation module, to map one or more source fields from the source application to one or more target fields from the target application; based on the matrix graph, transform the input data from the first data format to generate output data in a second data format, wherein the output data is compatible with the target application; and transfer the output data to the target application.

In one embodiment, generating the matrix graph further comprises mapping a plurality of source fields in the first data format to a plurality of corresponding target fields of the second format.

A computer-implemented method for platform-independent data transformation is also provided. The computer-implemented method comprising: receiving input data from a source application having a first data format, the input data to be transferred to a target application having a second data format, wherein the first data format and the second data format are different data formats; generating a matrix graph, using a data transformation module, to map one or more source fields from the source application to one or more target fields from the target application; based on the matrix graph, transforming the input data from the first data format to generate output data in a second data format, wherein the output data is compatible with the target application; and transferring the output data to the target application.

In one embodiment, generating the matrix graph further comprises mapping a plurality of source fields in the first data format to a plurality of corresponding target fields of the second format.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
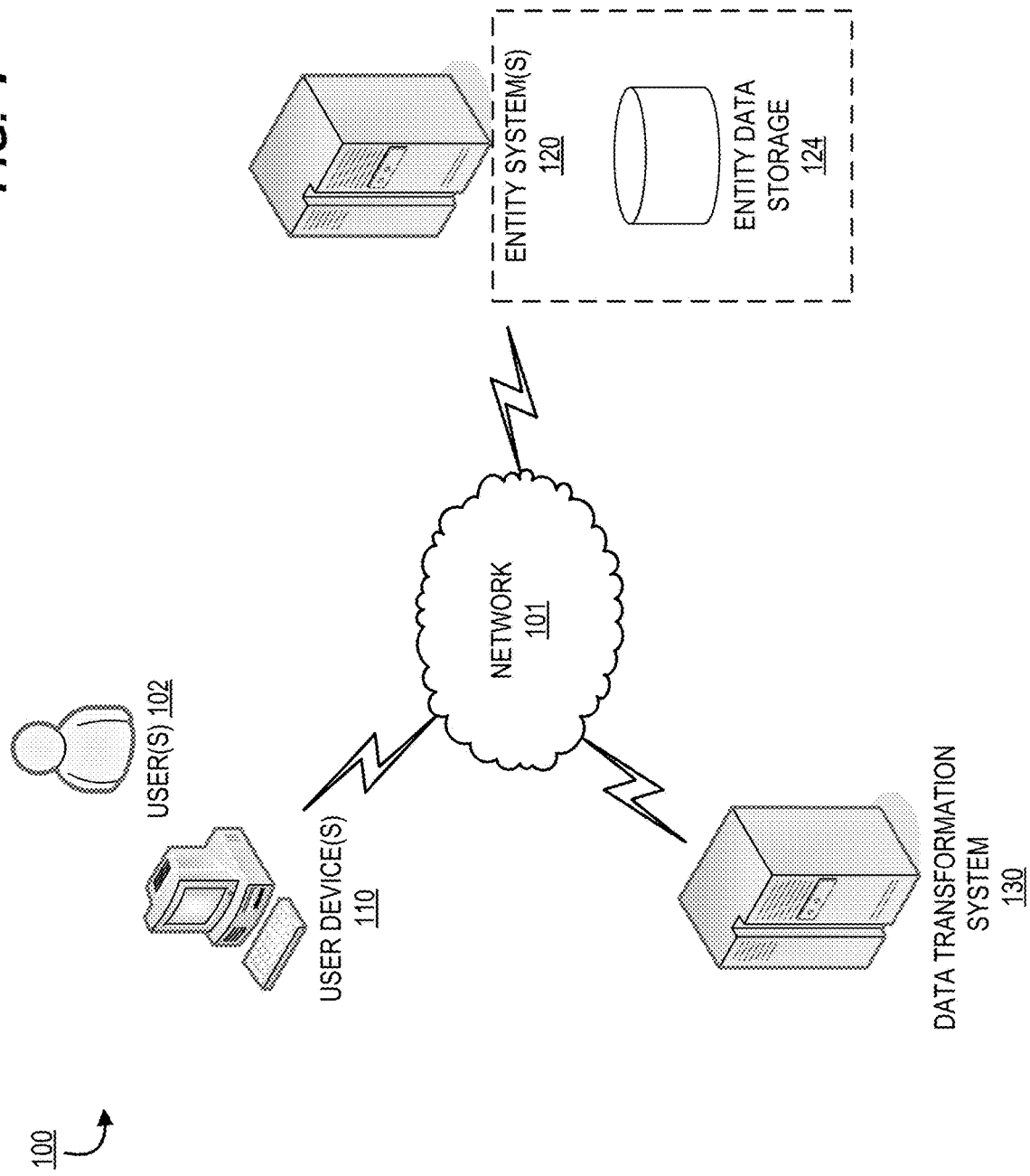
Figure 2:
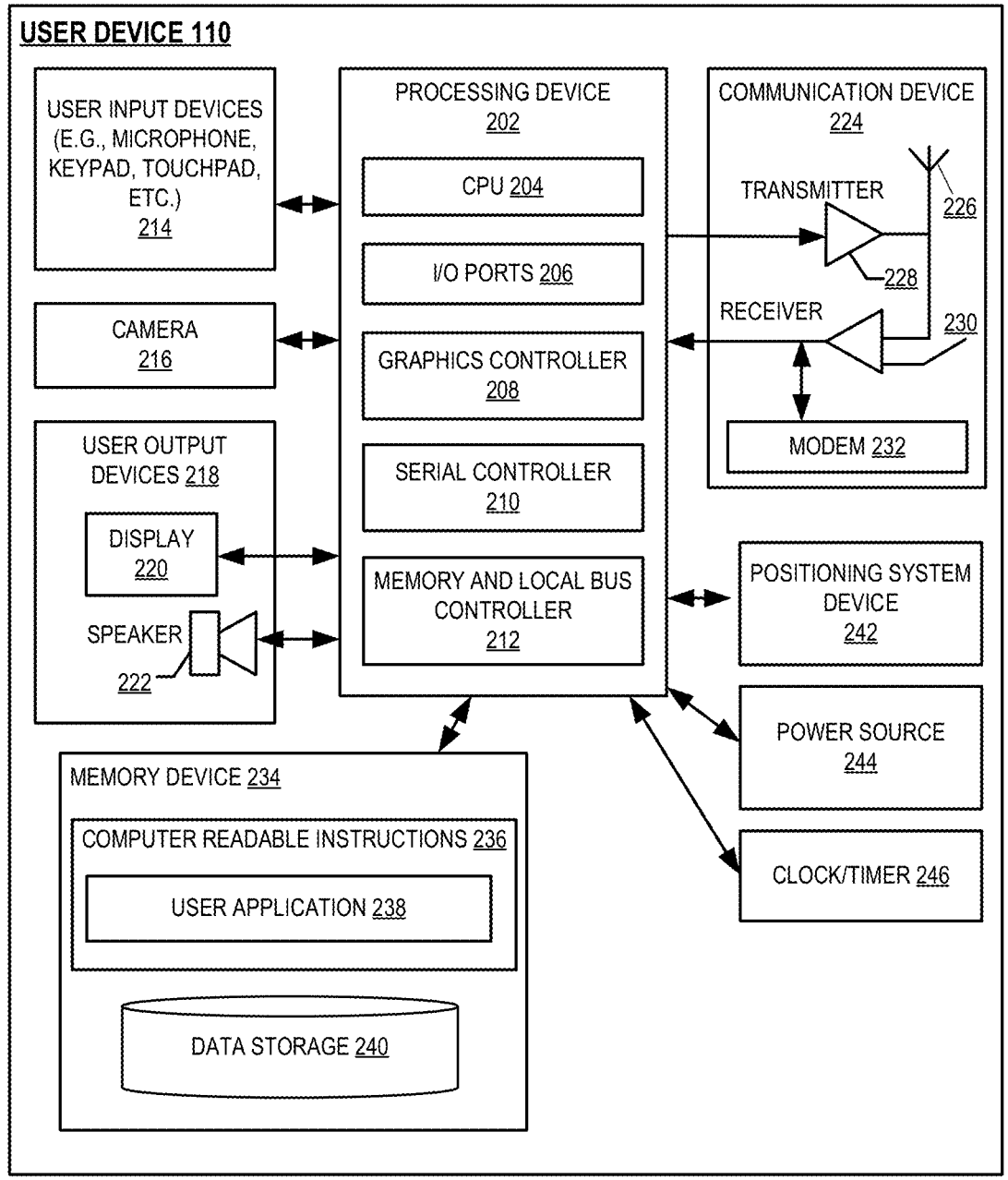
Figure 3:
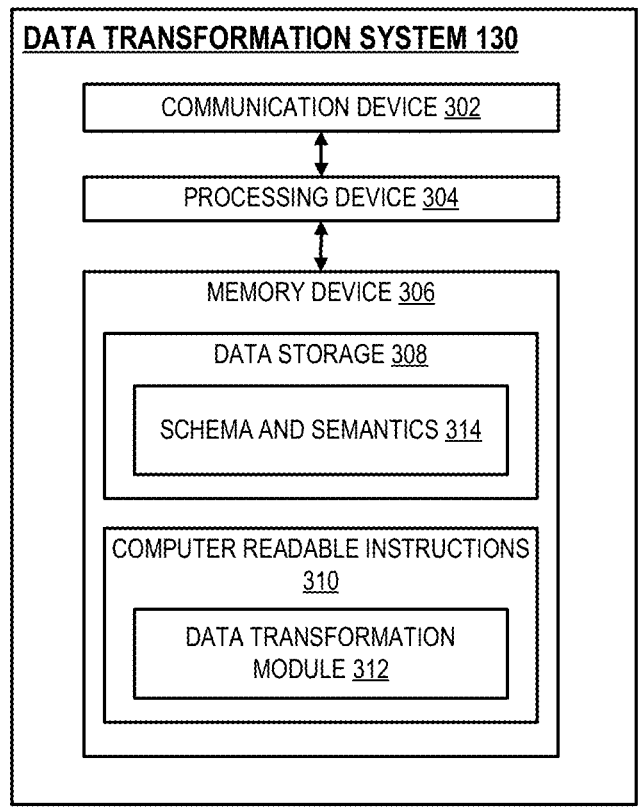
Figure 4:
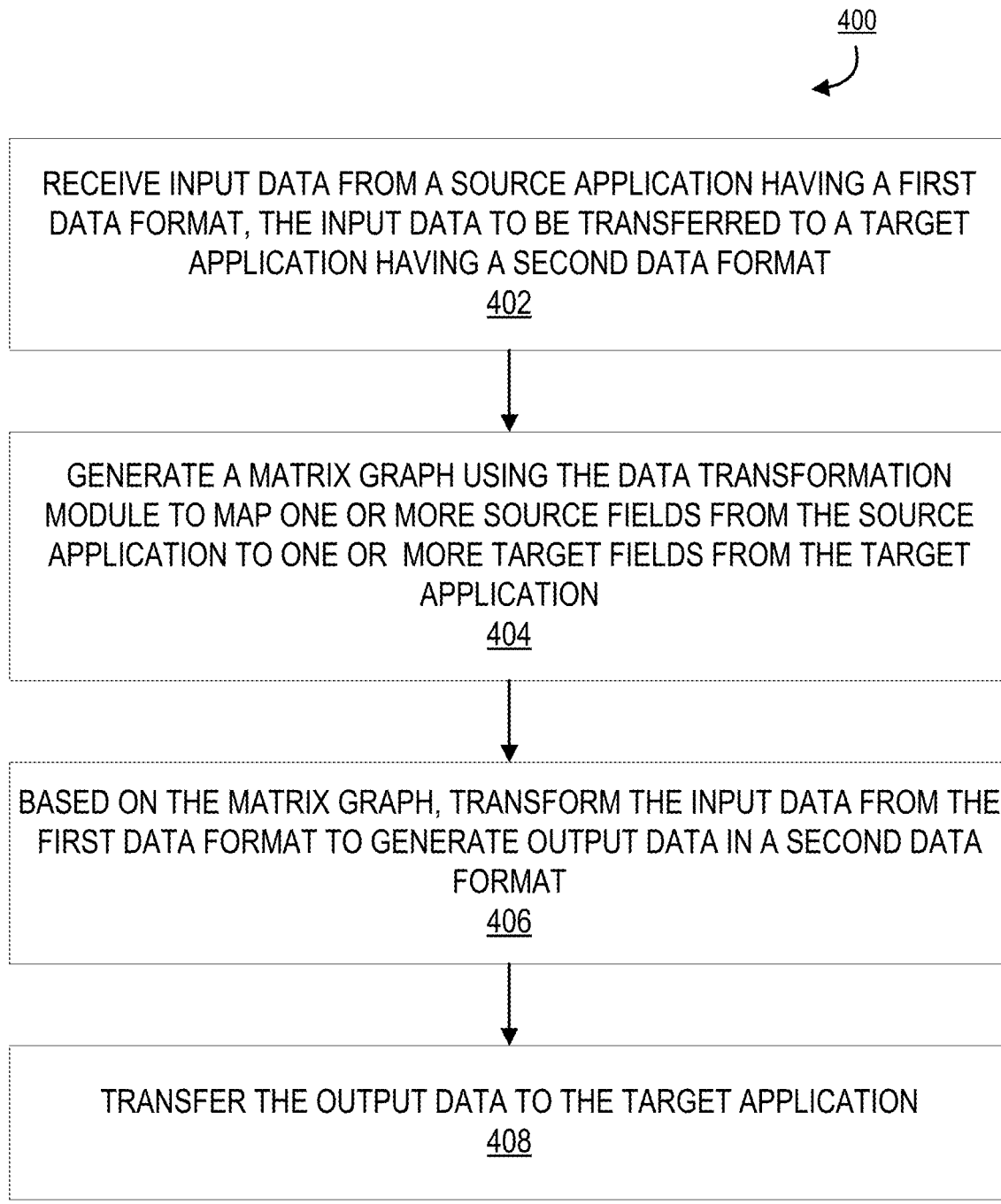
Figure 7:
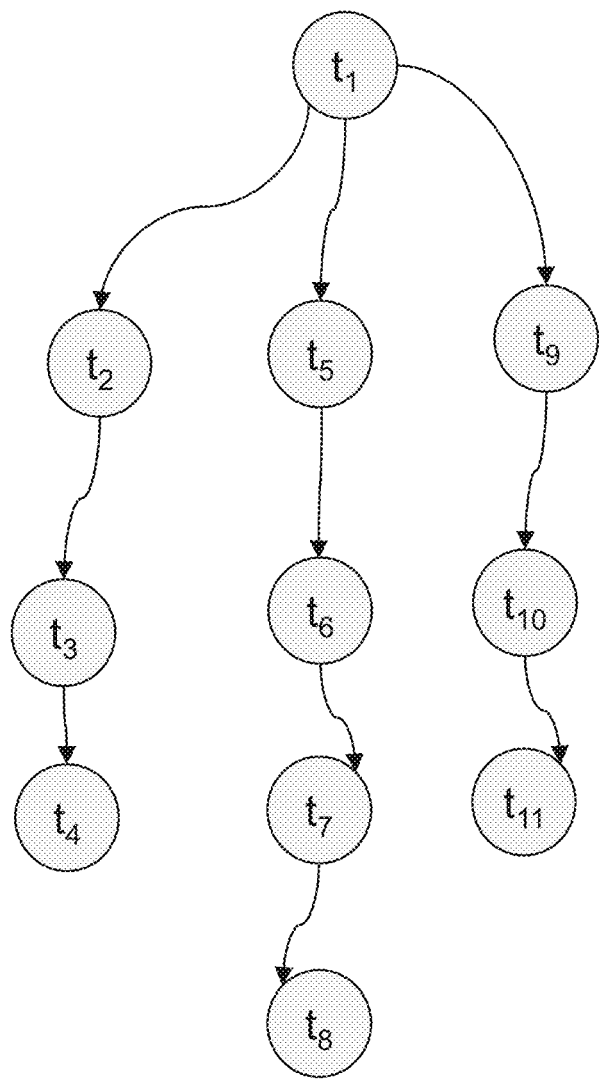
Figure 8:
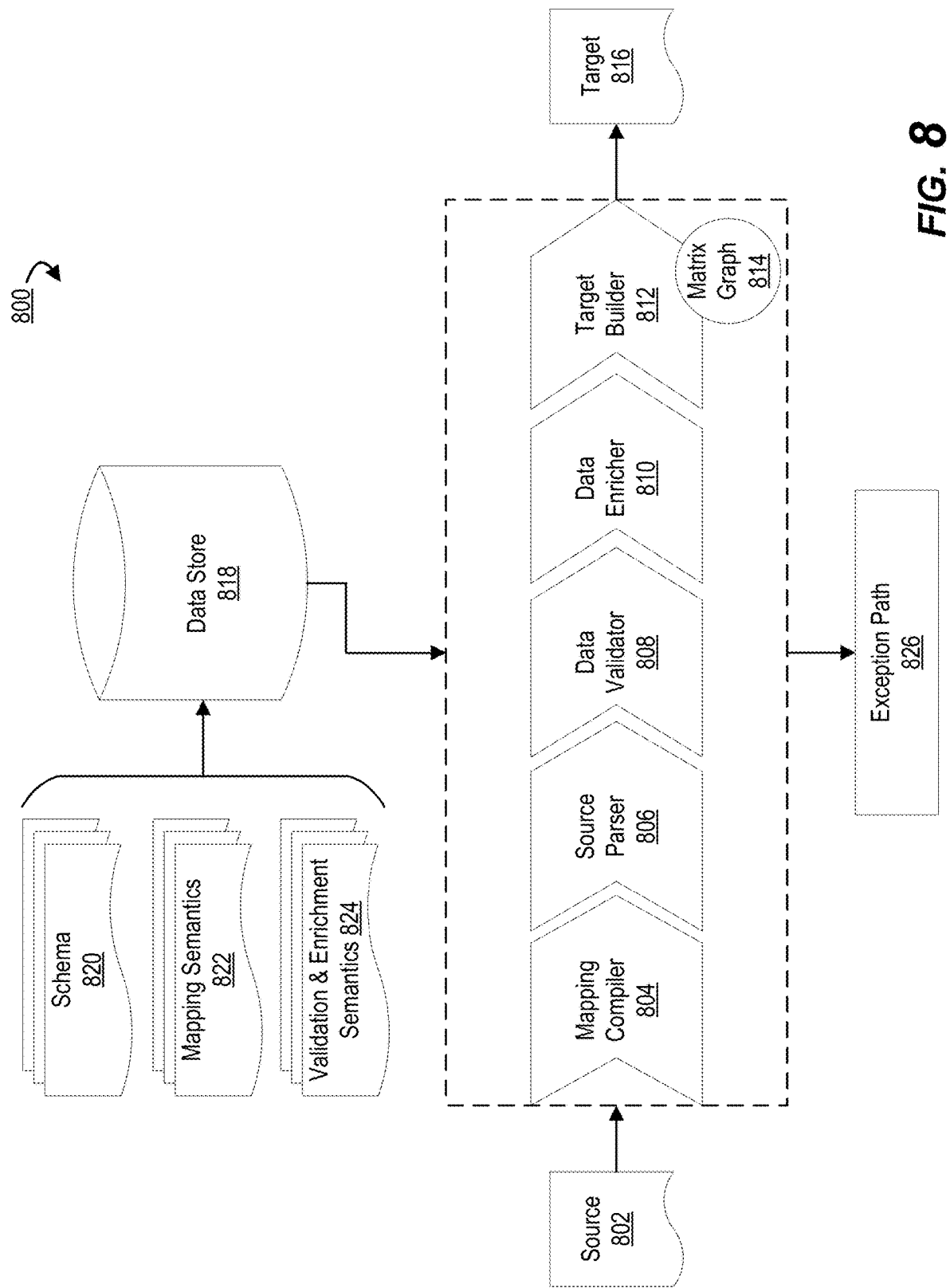

Having thus described embodiments of the invention in general terms, reference will now be made to the accompanying drawings, wherein:

FIG. 1 provides a data transformation system environment, in accordance with one embodiment of the invention;

FIG. 2 provides a block diagram of a user device, in accordance with one embodiment of the invention;

FIG. 3 provides a block diagram of the data transformation system, in accordance with one embodiment of the invention;

FIG. 4 provides a high level process map for data transformation, in accordance with one embodiment of the invention FIG. 5 provides an illustration of a node path, in accordance with one embodiment of the invention;

FIG. 6 provides an illustration of a matrix graph, in accordance with one embodiment of the invention;

FIG. 7 provides an illustration of a matrix graph relationship structure, in accordance with one embodiment of the invention; and FIG. 8 provides a block diagram illustrating a data transformation module, in accordance with one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, entertainment devices, laptop computers, cameras, video recorders, audio/video player, radio, global positioning system (GPS) devices, or any combination of the aforementioned. In some embodiments, a device may refer to an entity's computer system, platform, servers, databases, networked devices, or the like. The device may be used by the user to access the system directly or through an application, online portal, internet browser, virtual private network, or other connection channel. The device may be a computer device within a network of connected computer devices that share one or more network storage locations.

As used herein, the term "computing resource" or "computing hardware" may refer to elements of one or more computing devices, networks, or the like available to be used in the execution of tasks or processes. A computing resource may include processor, memory, network bandwidth and/or power used for the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison or nodes of a distributed computing cluster).

As used herein, the term "user" may refer to any entity or individual associated with the data transformation system. In some embodiments, a user may be a computing device user, a phone user, a mobile device application user, a customer of an entity or business, a financial institution customer (e.g., an account holder or a person who has an account (e.g., banking account, credit account, or the like)), a system operator, database manager, a support technician, and/or employee of an entity. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein, the term "entity" may be used to include any organization or collection of users that may interact with the data transformation system. An entity may refer to a business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

As used herein, "authentication information" may refer to any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing device, or the like to access, write, delete, copy, or otherwise modify data within at least a portion of the system.

To "monitor" is to watch, observe, or check something for a special purpose over a period of time. The "monitoring" may occur periodically over the period of time, or the monitoring may occur continuously over the period of time. In some embodiments, a system may actively monitor a database or data archive, wherein the system reaches out to the database and watches, observes, or checks the database for changes, updates, and the like. In other embodiments, a system may passively monitor a database, wherein the database provides information to the system and the system then watches, observes, or checks the provided information. In some embodiments a system, application, and/or module (such as the robotic process automation module and/or the entity platform described herein) may monitor a user input into the system. In further embodiments, the system may store said user input during an interaction in order to substantially replicate said user input at another time.

As used herein, a "connection" or an "interaction" may refer to any communication between one or more users, one or more entities or institutions, and/or one or more devices, nodes, clusters, or systems within the system environment described herein. For example, an interaction may refer to a transfer of data between systems, devices, and/or applications; an accessing of stored data by one or more devices; a transmission of a requested task; a reporting and correction of an error; or the like. In another example, an interaction may refer to a user interaction with a user device through a user interface in order to connect or communicate with an entity and/or entity system to complete an operation (e.g., request a transfer of funds from an account, complete a form, or the like).

Embodiments of the system, as described herein, are configured to receive input data from a first, source application and provide output data to a second, target application. In some embodiments, the input data in a first data format is transformed by the system which outputs a new, output data having a second data format. The input data and/or data formats may be altered or modified by the system during the data transformation process. In some embodiments, the first data format and the second data formats are different and/or incompatible data formats, wherein transforming the input data in the first format to output data in the second format makes the data compatible with a target (e.g., a target application) that specifically requires the second data format.

The invention provides a technical solution to a problem by utilizing computing devices in non-conventional, non-obvious ways to solve a problem inherent to data interchange and migration over organizations and applications. The invention employs a matrix graph constructed by the system to assist in mapping data fields from the source application to the target application thereby providing a generated map of equated or corresponding sets of source and target data fields that may be used for transforming the input data into the output data. A matrix graph is a lightweight tree that provides a field-to-field relationship between data formats and does not rely on code. In this way, the system and its use of the constructed matrix graph is platform agnostic or independent of any one particular programming language or application and may be used to interface across a variety of different applications. Due to the benefits of the matrix graph, the system be compatible, universally, across multiple platforms and application environments. The data transformation module may be modular and configured to operate in a "lift-and-shift" model, wherein the data transformation module may interface or bridge across a variety of even heterogeneous application to perform transformations.

In comparison to conventional methods such as Document Object Model (DOM) trees, the matrix graph reduces a memory usage (i.e., a footprint) and a number of processing cycles required of a CPU. While DOM trees generally tend to be memory intensive, as they generally require that an entire document or data set be loaded into memory and constructed as a tree of objects before access is even allowed. Further, as the tree continues to grow over time, the DOM tree size increases and further taxes computing resources. Comparatively, in one embodiment of the invention, a matrix graph may be generated at runtime (i.e., initialization) of a transformation operation, wherein a new matrix graph is dynamically generated in real-time providing access even during map constructions. In another embodiment, the system dissolves or deletes the matrix graph after runtime to make available computing resources (e.g., memory).

FIG. 1 provides data transformation system environment, in accordance with one embodiment of the invention. As illustrated in FIG. 1, the data transformation system 130 is operatively coupled, via a network 101, to the user device 110 and the entity system 120. In this way, the data transformation system 130 can send information to and receive information from the user device 110 and the entity system 120. FIG. 1 illustrates only one example of an embodiment of the system environment 100, and it will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual or system that desires to implement the benefits of the data transformation system and over the network 101, such as by automatically transforming data from a first format to a second format or integrate the data transformation module in a system. In some embodiments a user 102 is a user or entity transforming data to be compatible between disparate applications.

FIG. 2 provides a block diagram of a user device 110, in accordance with one embodiment of the invention. The user device 110 may generally include a processing device or processor 202 communicably coupled to devices such as, a memory device 234, user output devices 218 (for example, a user display device 220, or a speaker 222), user input devices 214 (such as a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like, one or more chips, and the like. The processing device 202 may further include a central processing unit 204, input/output (I/O) port controllers 206, a graphics controller or GPU 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with content provided from an entity. In some embodiments, the user application 238 further includes a client for leveraging the data transformation system 130 to transform a data format.

The processing device 202 may be configured to use the communication device 224 to communicate with one or more other devices on a network 101 such as, but not limited to the entity system 120 and the data transformation system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes one or more entity systems 120 (as illustrated in FIG. 1) which is connected to the user device 110 and the data transformation system 130 and which may be associated with one or more entities, institutions or the like. In this way, while only one entity system 120 is illustrated in FIG. 1, it is understood that multiple networked systems may make up the system environment 100. The entity system 120 generally comprises a communication device, a processing device, and a memory device. The entity system 120 comprises computer-readable instructions stored in the memory device, which in one embodiment includes the computer-readable instructions of an entity application. The entity system 120 may communicate with the user device 110 and the data transformation system 130 to, for example, complete transmit, upload, transfer, or otherwise provide data stored in an entity data storage 124 for processing and format transformation. In some embodiments, entity data storage 124 may further store one or more applications containing data. In some embodiments, the data of the one or more applications may be in a data format specific to an associated application, wherein the data format may not be compatible with other applications.

FIG. 3 provides a block diagram of the data transformation system 130, in accordance with one embodiment of the invention. The data transformation system 130 generally comprises a communication device 302, a processing device 304, and a memory device 306. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the data transformation system 130 comprises computer-readable instructions 310 stored in the memory device 306, which in one embodiment includes the computer-readable instructions 310 of a data transformation module 312. In some embodiments, the memory device 306 includes data storage 308 for storing data related to the system environment, but not limited to data created and/or used by the data transformation module 312 such as various schema, semantics, historical data, mapping configurations, matrix graphs and the like 314 as described herein.

In one embodiment of the invention, the data transformation module 312 may associate with applications having computer-executable program code that instructs the processing device 304 to operate the network communication device 302 to perform certain communication functions involving described herein. In one embodiment, the computer-executable program code of an application associated with the user device 110 and/or the entity system 120 may also instruct the processing device 304 to perform certain logic, data processing, and data storing functions of the application.

Embodiments of the data transformation system 130 may include multiple systems, servers, computers or the like maintained by one or many entities. In some embodiments, the data transformation system 130 may be part of the entity system 120. In other embodiments, the entity system 120 is distinct from the data transformation system 130. The data transformation system 130 may communicate with the entity system 120 via a secure connection generated for secure encrypted communications between the two systems either over the network 101 or alternative to the network 101.

Embodiments of the system, as described herein, are configured to receive input data from a first, source application and provide output data to a second, target application. In some embodiments, the input data in a first data format is transformed by the system which outputs a new, output data having a second data format. The first and second data formats may be altered or modified by the system during the data transformation process. In some embodiments, the first data format and the second data formats are different and/or incompatible data formats, wherein transforming the input data in the first format to output data in the second format makes the data compatible with a target (e.g., a target application) that specifically requires the second data format.

FIG. 4 provides a high level process map for data transformation, in accordance with one embodiment of the invention. As illustrated in block 402, the process 400 is initiated by first receiving input data from a source application having a first data format, wherein the input data is to be transferred to a target application having a second data format. As previously discussed, the input data from the source application having a first data format may be made compatible with the target application having the second data format through transformation of the input data to a new, output data in the second data format. Data input and/or output from the system may comprise data sets, files or similar object usable by computer applications. In some embodiments, examples of data formats may include Extensible Markup Language (XML), JavaScript Object Notation (JSON) or other formats known to those knowledgeable in the art.

In some embodiments, the system and/or the data transformation module may be namespace-aware and may operate independently from any one specific programming language, wherein the system and/or data transformation module may be compatible, universally, across multiple platforms and application environments. The data transformation module may be modular and configured to operate in a "lift-and-shift" model, wherein the data transformation module may interface or bridge across a variety of even heterogeneous application to perform transformations.

Figure 5:
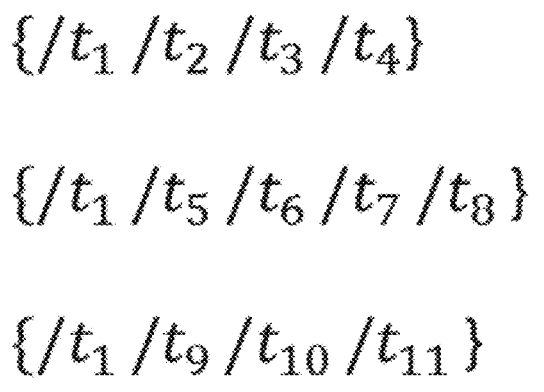

FIG. 5 provides an illustrative example of a node or file path, in accordance with one embodiment of the invention. The node path of FIG. 5 illustrates a plurality of nodes or objects $(t_1, t_2, \ldots t_{11})$ which may be received by the system as input data received from a source application. The plurality of nodes or object may include one or more defined relationships or hierarchies. In one example the input data $(t_1, t_2, t_{11})$ may be transformed and exported as output data $(e_1, e_2, \ldots e_{11})$.

Referring now back to FIG. 4, as illustrated in block 404, the system generates a matrix graph using the data transformation module to map one or more source fields from the source application to one or more target fields form the target application. A matrix graph is a graphical map constructed by the system to assist in mapping data fields from the source application to the target application thereby providing a generated map of equated or corresponding sets of source and target data fields that may be used for transforming the input data into the output data. A matrix graph is a lightweight tree that provides a field-to-field relationship between data formats and does not rely on code. In this way, the system and its use of the constructed matrix graph is platform agnostic or independent of any one particular programming language or application and may be used to interface across a variety of different applications.

In comparison to conventional methods such as Document Object Model (DOM) trees, the matrix graph reduces a memory usage (i.e., a footprint) and a number of processing cycles required of a CPU. While DOM trees generally tend to be memory intensive, as they generally require that an entire document or data set be loaded into memory and constructed as a tree of objects before access is even allowed. Further, as the tree continues to grow over time, the DOM tree size increases and further taxes computing resources. Comparatively, in one embodiment of the invention, a matrix graph may be generated at runtime (i.e., initialization) of a transformation operation, wherein a new matrix graph is dynamically generated in real-time providing access even during map constructions. In another embodiment, the system dissolves or deletes the matrix graph after runtime to make available computing resources (e.g., memory).

In yet another embodiment, as the matrix graph is a graphical map, the matrix graph further allows for the system to generate the output data in the second format without generating additional code. In some embodiments, specific, custom functions, additional information or input, code portions or the like can be plugged-in to the process and steps described herein, if necessary. In a specific embodiment, custom extensions (e.g., wrapper) may be plugged-in to the system to provide additional functions to the transformation process.

FIG. 6 provides an illustration of a matrix graph, in accordance with one embodiment of the invention. In the illustrated embodiment, the matrix graph is constructed from the node path of FIG. 5, wherein the matrix graph is namespace aware and preserves node relationships and hierarchies as it maps the data fields. The matrix graph is held in memory during the transformation operation. In some embodiments, the matrix graph is held in temporary memory such as volatile or non-volatile RAM. FIG. 7 provides an illustration of a matrix graph relationship structure, in accordance with one embodiment of the invention.

Referring now back to FIG. 4, as illustrated in block 406, using the matrix graph, the system transforms the input data from the first data format to generate output data in a second data format. The matrix graph is generated according to the requirements of the source and target applications. In one embodiment, generating the matrix graph and applying it for transformation further comprises mapping a plurality of source fields in the first data format to a plurality of corresponding target fields of the second format. In one example, a source data field may comprise a date. The system identifies that the source data field is a date value and maps the source data field to a corresponding target data field, wherein the source data field corresponds to the same date value. In a specific embodiment, the date value may be a date of birth in a particular user's file. Finally, as illustrated in block 408, the system transfers the output data to the target application, wherein the output data is in the second format and compatible with the target application as a result of the data transformation utilizing the constructed matrix graph.

In some embodiments, the system may transform data for compatibility across channels or operating systems, wherein the channels may have different, normally incompatible data or formats. Data may be received at a first data channel and then output by the system to a second data channel after transformation. For example, the system may transform data received at an ATM for use with an online portal (e.g., online banking system).

FIG. 8 provides a block diagram illustrating a data transformation module, in accordance with one embodiment of the invention. The data transformation module 800 receives an input data from a source 802, transforms the input data to an output data, and exports the output data to a target 816. In some embodiments, the data transformation module 130 may comprise a design component or phase comprising a data store 818. In some embodiments, the data transformation module 800 may comprise an execution component or phase comprising a mapping compiler 804, a source parser 806, a data validator 808, a data enricher 810, and/or a target builder 812.

In some embodiments, the data transformation module may comprise a data store 818. The data store 818 stores a number of schema 820, mapping semantics 822, validation and enrichment semantics 824 and the like that are pulled and referenced by the data transformation module during a transformation operation. The various schema and semantics may provide sets of defined rules outlining transformation guidelines between various formats and/or applications. In some embodiments, the data store 818 may be stored on a local machine or may be stored off-site, wherein required information may be pulled or referenced remotely over a network connection. In this way, the data store 818 may become a library of semantics and schema through continued use and update of the data store 818 over time.

In some embodiments, the data transformation module may comprise a mapping compiler module 804. In some embodiments, the mapping compiler module 804 retrieves and verifies mapping schema, rules, and semantics pulled from the data store 818. The mapping compiler module 804 then goes on to generate a mapping configuration which outlines a transformation operation of the input data based on the verified data. In some embodiments, the data transformation module generates the mapping configuration based on a past transformation operation, wherein the system may employ historical information and deep learning technology to determine a mapping configuration for a transformation operation.

In some embodiments, the data transformation module may comprise a source parser module 806. In one embodiment, the source parser module 806 may be configured to read the mapping configuration and provide instruction based on the rules contained therein. The source parser module 806 identifies the source application and target application and parses the data input from the source application for transformation. The source parser module may further retrieve the one or more source fields, the one or more target fields, and the input data as defined by the mapping configuration.

In some embodiments, the data transformation module may comprise a data validator module 808. In one embodiment, the validator module 808 is configured for validating the one or more source fields, the one or more target fields, and the input data as defined by the mapping configuration, wherein the validator module 808 may reference the mapping configuration to validate the data.

In some embodiments, the data transformation module may comprise a data enricher module 810. In some embodiments, the enricher module 810 is configured for at least one of converting, updating, appending, or modifying the one or more source fields and the input data. In some embodiments, the enricher module 810 modifies the input data before the data transformation module maps the input data to the one or more target fields of the matrix graph. In another embodiment, the enricher module 810 may modify the data after transformation during export to the source application.

In some embodiments, the data transformation module may comprise a target builder module 812. In some embodiments, the target builder module 812 is configured for generating the matrix graph 814 based on the predefined rules outlined by the mapping configuration. The data transformation module generates the output data in the second data format for the target application based on the matrix graph. As previously discussed, the target builder may be configured to generate the matrix graph and transform the input data without generating or writing additional code specific to either the source and target formats.

In some embodiments, the data transformation module may generate or provide an exception path 826 for one or more identified or determined errors, wherein the exception path 826 defines one or more corrective actions for resolving the error. In one embodiment, errors may be identified or determined by the data validator module 808. In some embodiments, an error may include a mismatched data field or data object identified during transformation. In a specific example, the data transformation module may identify a date value from the input data in an improper date format (i.e., American vs. European dating formats). In response to identifying an error, the data transformation module may reconfigure or rebuild the mapping configuration to correct the identified error. In one embodiment, the system may transmit or advance the error to a support representative in response to determining the presence of the error and/or a failed resolution of the error by the data transformation module itself In some embodiments, the data transformation module may be further configured to transmit a status update for each stage of a transformation operation to a logger. In one embodiment, the data transformation module may comprise a logger module. In some embodiments, information collected by the logger may be recorded and/or transmitted to another entity for regulatory or auditing purposes.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for platform-independent data transformation, the system comprising:

a memory device with computer-readable program code stored thereon, the memory device comprising a plurality of applications;

a communication device in communication with a network; and a processing device operatively coupled to the memory device and the communication device, wherein the processing device is configured to execute the computer-readable program code to:

receive input data from a source application having a first data format, the input data to be transferred to a target application having a second data format, wherein the first data format and the second data format are different data formats, and wherein the input data comprises a node path defining hierarchical relationships between one or more source fields of the source application;

generate, in real-time and in response to receiving the input data to be transferred to the target application, a matrix graph, using the node path, to map only a specified portion of the source application to one or more target fields from the target application, wherein the matrix graph is a graphical map of only the specified portion of the source application and retains the hierarchical relationships between the one or more source fields;

based on the matrix graph, transform the input data corresponding with the specified portion from the first data format to generate output data in the second data format, wherein the output data is compatible with the target application;

delete, after transforming the input data, the matrix graph; and transfer the output data to the target application.

2. The system of claim 1, wherein generating the matrix graph further comprises mapping a plurality of source fields in the first data format to a plurality of corresponding target fields of the second data format.

3. The system of claim 2, wherein transforming the input data further comprises transferring elements of the input data from the plurality of source fields to the corresponding target fields of the matrix graph to generate the output data.

4. The system of claim 1, wherein the matrix graph is generated dynamically at initialization of a transformation operation.

5. The system of claim 1, further comprising a mapping compiler module configured for:

retrieving and verifying mapping schema, rules, and semantics; and generating a mapping configuration outlining a transformation operation of the input data.

6. The system of claim 5, wherein the processing device is further configured to execute the computer-readable program code to generate the mapping configuration based on a past transformation operation.

7. The system of claim 6, further comprising a parser module configured for:

reading the mapping configuration;

identifying the source application and the target application;

parsing the input data from the source application; and retrieving the one or more source fields, the one or more target fields, and the input data as defined by the mapping configuration.

8. The system of claim 7, further comprising a validator module configured for validating the one or more source fields, the one or more target fields, and the input data as defined by the mapping configuration.

9. The system of claim 8, wherein the processing device is further configured to:

generate an exception path in response to identifying an error; and reconfigure the mapping configuration.

10. The system of claim 9, wherein the processing device is further configured to advance the error to a support representative.

11. The system of claim 7, further comprising an enricher module configured for at least one of converting, updating, appending, or modifying the one or more source fields and the input data.

12. The system of claim 7, further comprising a target builder module configured for:

generating the matrix graph based on the mapping configuration; and based on the matrix graph, generating the output data in the second data format for the target application.

13. The system of claim 12, wherein the target builder module generates the output data in the second data format without generating additional code.

14. The system of claim 1 further comprising a data store comprising mapping schema, rules, and semantics for transforming the input data in the first data format to the output data in the second data format.

15. The system of claim 1, wherein the processing device is further configured to execute the computer-readable program code to transmit a status update for each stage of a transformation operation to a logger.

16. The system of claim 1, wherein the matrix graph interfaces across heterogeneous applications.

17. A computer program product for platform-independent data transformation, wherein the computer program product comprises at least one non-transitory computer readable medium comprising computer readable instructions, the computer readable instructions, when executed by a computer processor, cause the computer processor to:

receive input data from a source application having a first data format, the input data to be transferred to a target application having a second data format, wherein the first data format and the second data format are different data formats, and wherein the input data comprises a node path defining hierarchical relationships between one or more source fields of the source application;

generate, in real-time and in response to receiving the input data to be transferred to the target application, a matrix graph, using the node path, to map only a specified portion of the source application to one or more target fields from the target application, wherein the matrix graph is a graphical map of only the specified portion of the source application and retains the hierarchical relationships between the one or more source fields;

based on the matrix graph, transform the input data corresponding with the specified portion from the first data format to generate output data in the second data format, wherein the output data is compatible with the target application;

delete, after transforming the input data, the matrix graph; and transfer the output data to the target application.

18. The computer program product of claim 17, wherein generating the matrix graph further comprises mapping a plurality of source fields in the first data format to a plurality of corresponding target fields of the second data format.

19. A computer-implemented method for platform-independent data transformation, the computer-implemented method comprising:
- receiving input data from a source application having a first data format, the input data to be transferred to a target application having a second data format, wherein the first data format and the second data format are different data formats, and wherein the input data comprises a node path defining hierarchical relationships between one or more source fields of the source application;
- generating, in real-time and in response to receiving the input data to be transferred to the target application, a matrix graph to map only a specified portion of the source application to one or more target fields from the target application, wherein the matrix graph is a graphical map of only the specified portion of the source application and retains the hierarchical relationships between the one or more source fields;
- based on the matrix graph, transforming the input data corresponding with the specified portion from the first data format to generate output data in the second data format, wherein the output data is compatible with the target application;
- deleting, after transforming the input data, the matrix graph; and
- transferring the output data to the target application.

20. The computer-implemented method of claim 19, comprising transmitting a status update for each stage of a transformation operation to a logger.

* * * * *